United States Patent
He et al.

(10) Patent No.: US 12,106,783 B2
(45) Date of Patent: Oct. 1, 2024

(54) MICROWAVE-ASSISTED MAGNETIC RECORDING (MAMR) HEAD SLIDER WITH DIAMOIND-LIKE CARBON LAYER AND A SILICON NITRIDE LAYER, AND RELATED HEAD GIMBAL ASSEMBLY AND DISK DRIVE UNIT

(71) Applicant: SAE Magnetics (H.K.) Ltd., Hong Kong (CN)

(72) Inventors: Da Yao He, Hong Kong (CN); Rong Huang, Hong Kong (CN); Hua Li, Hong Kong (CN); Jian Hui Huang, Hong Kong (CN); Peng Liu, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 18/348,073

(22) Filed: Jul. 6, 2023

(65) Prior Publication Data
US 2024/0013804 A1    Jan. 11, 2024

(30) Foreign Application Priority Data
Jul. 7, 2022    (CN) .......................... 202210793047.2

(51) Int. Cl.
| | | |
|---|---|---|
| *G11B 5/255* | (2006.01) | |
| *G11B 5/31* | (2006.01) | |
| *G11B 5/40* | (2006.01) | |
| G11B 5/00 | (2006.01) | |
| G11B 5/48 | (2006.01) | |

(52) U.S. Cl.
CPC ............ *G11B 5/255* (2013.01); *G11B 5/3106* (2013.01); *G11B 5/40* (2013.01); *G11B 2005/0021* (2013.01); *G11B 2005/0024* (2013.01); *G11B 5/4826* (2013.01)

(58) Field of Classification Search
None
See application file for complete search history.

(56) References Cited

U.S. PATENT DOCUMENTS 11,074,929 B1 *    7/2021    Herber et al.    .......... G11B 5/255

FOREIGN PATENT DOCUMENTS

| JP | 09212814 A | * | 8/1997 | ............. G11B 5/255 |
| JP | 2005302185 A | * | 10/2005 | ............... G11B 5/60 |

* cited by examiner

*Primary Examiner* — Craig A. Renner
(74) *Attorney, Agent, or Firm* — Nixon & Vanderhye, P.C.

(57) ABSTRACT

The present disclosure discloses a device with a protective layer, including a substrate, a seed layer formed on the substrate, and a diamond-like carbon layer formed on the seed layer, where the seed layer is a silicon nitride layer, and a content of nitrogen in the silicon nitride layer is 9%-17%. The present disclosure further discloses a microwave-assisted magnetic recording (MAMR) head slider, a head gimbal assembly, and a disk drive unit. The device has good thermal stability, oxidation resistance and corrosion resistance, thereby improving reliability and prolonging service life of an MAMR head.

20 Claims, 7 Drawing Sheets

MICROWAVE-ASSISTED MAGNETIC RECORDING (MAMR) HEAD SLIDER WITH DIAMOIND-LIKE CARBON LAYER AND A SILICON NITRIDE LAYER, AND RELATED HEAD GIMBAL ASSEMBLY AND DISK DRIVE UNIT

CROSS-REFERENCE TO RELATED APPLICATIONS

This application claims priority to CN patent application Ser. No. 20/221,0793047.2 filed Jul. 7, 2022, the entire contents of which are hereby incorporated by reference.

TECHNICAL FIELD

The present disclosure relates to an information recording disk drive unit, and in particular, to a protective layer structure of a microwave-assisted magnetic recording (MAMR) head slider with a spin torque oscillator (STO) in a hard disk drive.

BACKGROUND

A hard disk drive (HDD) is a common information storage device. With the increase of a recording density of the HDD, there is an urgent need to improve performance of a head and a magnetic recording medium. In the HDD, the head embedded in a slider flies on a surface of the magnetic recording medium to read and write data.

To achieve a higher recording density of a head installed in a hard disk device, a write track pitch and bits need to be narrowed. A surface area of a main magnetic pole on a surface of an air bearing decreases significantly with the increase of a recording density. As the magnetic pole is narrowed in this way in a conventional head, a recording field becomes smaller and has a recording density greater than a specific recording density, and it is no longer possible to realize a recording field required for writing. To solve this problem, a high-frequency magnetic field assisted recording (MAMR) method has been proposed. Different from the traditional head, the MAMR head forms a microwave oscillator (STO) on or near the main magnetic pole. When a direct current is applied to the STO, a ferromagnetic layer on the STO generates a high-frequency oscillating auxiliary magnetic field, which is applied to the recording medium to reduce coercivity of the medium. In this state, the recording field is applied to the medium to record data.

The MAMR head often runs in a high-temperature environment, so there is an urgent need to improve thermal stability, oxidation resistance and corrosion resistance, and other performance of a writing head of the MAMR head, to prolong the service life of the MAMR head.

SUMMARY

An objective of the present disclosure is to provide a device with a protective layer, which has high reliability and long service life.

Another specific objective of the present disclosure is to provide an improved MAMR head slider, which has a protective layer structure, thereby achieving good thermal stability, oxidation resistance and corrosion resistance, so as to improve reliability of an MAMR head and prolonging the service life of the MAMR head.

Still another specific objective of the present disclosure is to provide a head gimbal assembly, where an MAMR head has high reliability and long service life.

Yet another specific objective of the present disclosure is to provide a disk drive unit, where an MAMR head has high reliability and long service life.

To achieve the above objective, the present disclosure provides a device with a protective layer, including a substrate, a seed layer formed on the substrate, and a diamond-like carbon (DLC) layer formed on the seed layer, where the seed layer is a silicon nitride (SiN) layer, and a content of nitrogen in the silicon nitride layer is 9%-17%.

The present disclosure provides an MAMR head slider, including a slider substrate embedded therein with an MAMR head with a spin torque oscillator, where the MAMR head slider further includes a seed layer formed on the slider substrate and a DLC layer formed on the seed layer, where the seed layer is a silicon nitride (SiN) layer, and a content of nitrogen in the silicon nitride layer is 9%-17%.

Preferably, the silicon nitride layer has a thickness in a range of 3-7 Å. Preferably, the silicon nitride layer has a thickness of 5 Å.

Preferably, the diamond-like carbon layer has a thickness in a range of 10-20 Å. Preferably, the diamond-like carbon layer has a thickness of 15 Å.

Preferably, the silicon nitride layer has a first interface adjacent to the diamond-like carbon layer and a second interface adjacent to the substrate, and a content of nitrogen on the second interface is greater than a content of nitrogen on the first interface.

Preferably, from the second interface to the first interface, the content of nitrogen in the silicon nitride layer decreases.

The present disclosure further provides a head gimbal assembly, including the MAMR head slider described above and a cantilever member for supporting the MAMR head slider.

The present disclosure further provides a disk drive unit, including a head gimbal assembly provided with the MAMR head slider described above and a cantilever member for supporting the MAMR head slider; a driving arm connected to the head gimbal assembly; and a series of disks and a spindle motor for rotating the disks.

Compared with the prior art, the MAMR head slider according to the present disclosure has a seed layer formed on the slider substrate and a DLC layer formed on the seed layer, where the seed layer is an SiN layer, the content of nitrogen in the SiN layer is 9%-17%, and preferably, the SiN layer has a thickness in the range of 3-7 Å. As an intermediate layer between the slider substrate and the DLC layer as a surface layer, the SiN layer has good adhesion. Moreover, the optimized and specific content of nitrogen and the specific thickness make the SiN layer as the seed layer and the DLC layer as the surface layer have good thermal stability and oxidation resistance, thereby further improving reliability of the MAMR head and prolonging the service life of the MAMR head, and correspondingly prolonging the service life of the disk drive unit. The device with a protective layer according to the present disclosure is further suitable for semiconductor or non-semiconductor products in other forms.

The present disclosure will become clearer from the following description with reference to the accompanying drawings, and the accompanying drawings are used to explain embodiments of the present disclosure.

DETAILED DESCRIPTION

Figure 1:
FIG. 1 is a schematic structural diagram of a device 100 with a protective layer according to the present disclosure.

Several different optimal embodiments of the present disclosure will be described below with reference to the accompanying drawings, where the same reference numerals in different figures represent the same components. As described above, the present disclosure essentially provides a device with a protective layer and specific use thereof, and particularly relates to an MAMR head slider with a protective layer, which achieves good thermal stability, oxidation resistance and corrosion resistance, so as to improve reliability of an MAMR head and prolong service life of the MAMR head.

FIG. 1 is a schematic structural diagram of a device 100 with a protective layer according to the present disclosure. The device 100 includes a substrate 10 and a protective layer 11 formed on the substrate 10. Optionally, for different products, the substrate 10 may include one or more selected from the group consisting of glass, sapphire, a ceramic, a polymer, a metal, and a metal oxide, and functional elements are mounted on or embedded in the substrate 10 to achieve corresponding functions. As a protective layer of the substrate 10, the protective layer 11 has good thermal stability, oxidation resistance and corrosion resistance, thereby ensuring that an element on the substrate 10 is not damaged and prolonging the service life of the element/product. Specifically, the protective layer 11 includes a seed layer 101 formed on the substrate 10 and a DLC layer 102 formed on the seed layer 101. Preferably, the seed layer is an SiN layer. A content of nitrogen in the silicon nitride layer is 9%-17%, and the silicon nitride layer has a thickness in a range of 3-7 Å. As an intermediate layer between the substrate 10 and the DLC layer 102 as a surface layer, the SiN layer 101 has good adhesion. Moreover, the optimized and specific content of nitrogen and the specific thickness make the SiN layer 101 as the seed layer and the DLC layer 102 as the surface layer have good thermal stability and oxidation resistance, thereby further prolonging service lives of the substrate 10 and functional elements thereof. In a preferred embodiment, the DLC layer 102 has a thickness in a range of 10-20 Å.

The present disclosure and use thereof are further described below by taking a substrate of an MAMR head slider as an example, but the present disclosure and use thereof are not limited thereto.

Figure 2:
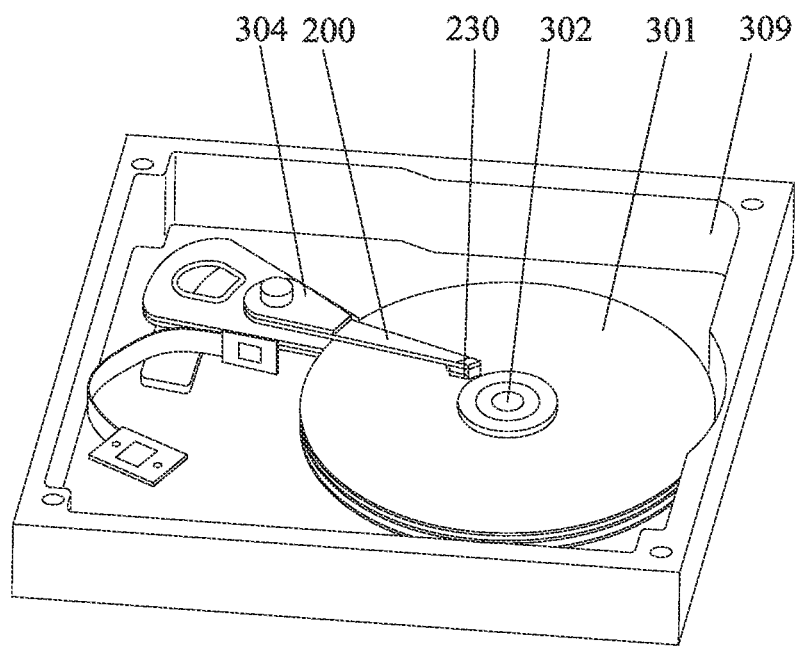
FIG. 2 is a perspective diagram of an HDD with an MAMR head according to the present disclosure.

FIG. 2 is a perspective diagram of an HDD according to an embodiment of the present disclosure. The HDD 300 includes a head gimbal assembly (HGA) 200, a driving arm 304 connected to the HGA 200, a series of rotating disks 301, and a spindle motor 302 for driving the disks 301, all of which are installed in a housing 309. The structure of the HDD 300 according to the present disclosure is not limited thereto. For example, there may be one rotating disk 301, one HGA 200, and one driving arm 304. Each HGA 200 includes a cantilever member (not marked) and an MAMR head slider 230 carried on the cantilever member and configured to read data from or write data in the rotating disk 301.

Figure 3:
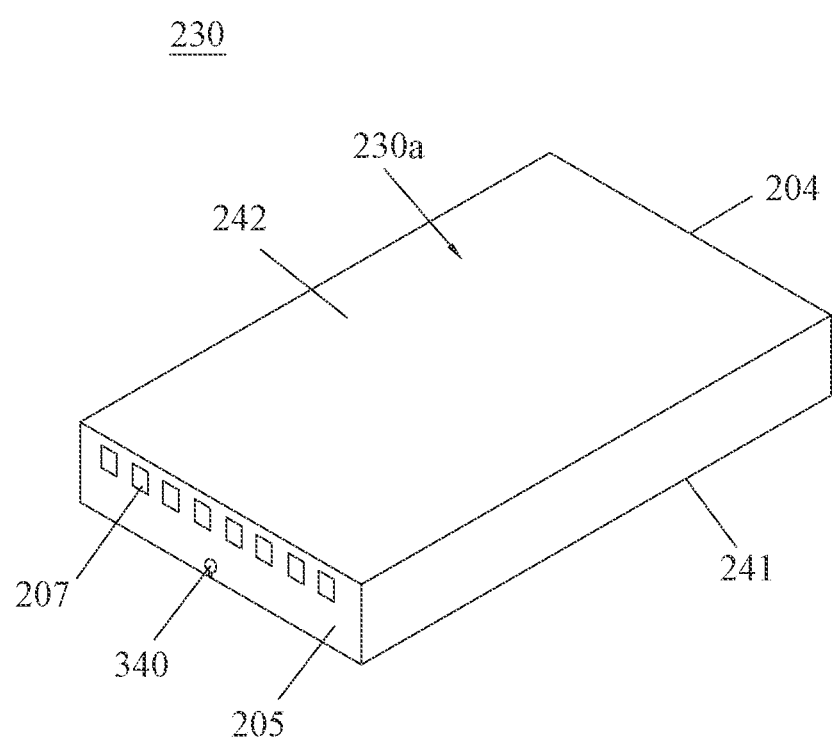
FIG. 3 is a perspective diagram of an MAMR head slider according to the present disclosure.

As shown in FIG. 3, the MAMR head slider 230 includes a substrate 230a and an MAMR head 340 embedded in the substrate 230a.

Specifically, as shown in FIG. 3, the MAMR head slider 230 includes a leading edge 204, a trailing edge 205, an air bearing surface (ABS) 241 facing a disk and designed to provide an appropriate flying height, an opposite surface 242 opposite to the ABS 241, and an MAMR head 340 embedded in the trailing edge 205. A read-write element is embedded in the trailing edge 205. A plurality of (for example, eight) connecting contacts 207 are provided on the trailing edge 205 to be connected to the cantilever member 209 of the HGA 200.

Figure 4:
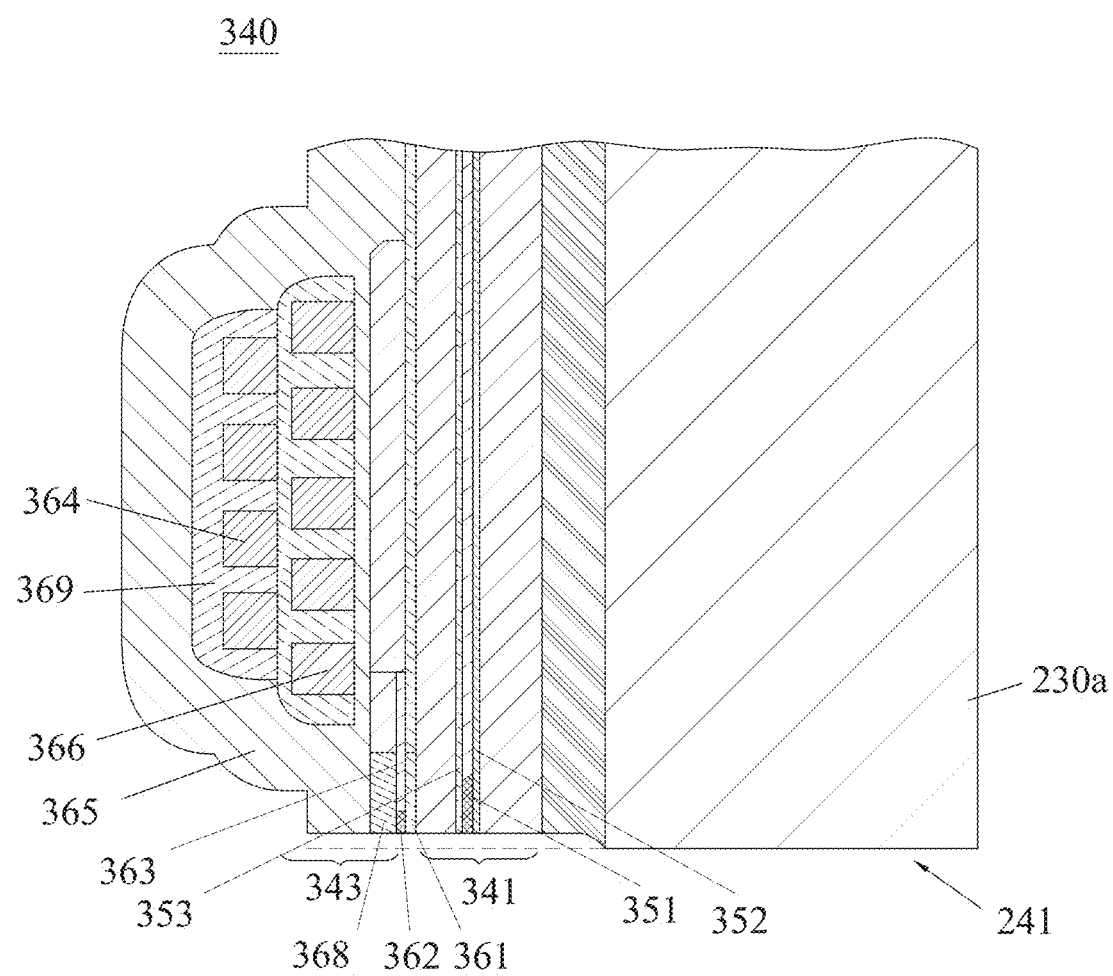
FIG. 4 is a sectional view of an MAMR head slider of FIG. 2.

Specifically, as shown in a partial sectional view of FIG. 4, the MAMR head slider 230 includes a magnetoresistive (MR) read head 341 formed on a substrate 230a and a write head 343 formed on the MR read head 341. For example, the MR read head 341 may be a current perpendicular to plane (CPP) sensor, a current in plane (CIP) sensor, a tunnel magnetoresistive (TMR) sensor, a giant magnetoresistive (GMR) sensor, an anisotropic magnetoresistive (AMR) sensor, or the like.

The read head 341 includes a magnetic film 351 showing a magnetoresistance effect; and two shielding layers 352 and 353 arranged on a trailing side and a leading side of the magnetic film 351 with a magnetic film 351 sandwiched therebetween.

Figure 5:
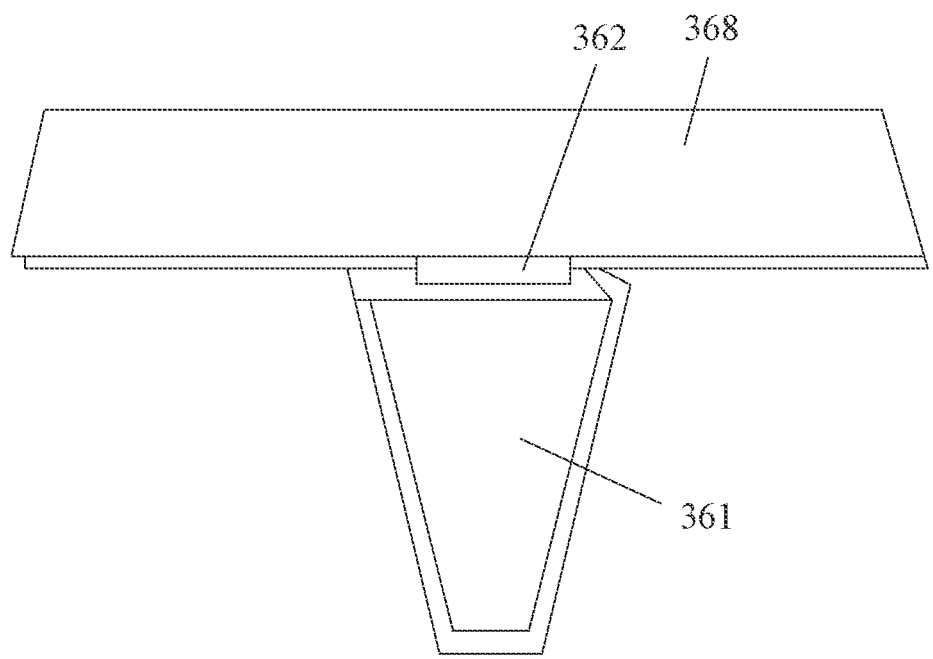
FIG. 5 is a partial schematic diagram of an MAMR head slider, showing an STO and a magnetic pole part.

The write head 343 is arranged on a trailing end 205 side of the slider 230, and includes a main magnetic pole layer 361, an STO 362, a gap layer 363, a write coil layer 364, a write shielding layer 365, and a backing coil layer 366. The main magnetic pole layer 361 is arranged on an insulating layer made of an insulating material, and is configured to concentrate and guide a magnetic flux excited by a write current flowing through the write coil layer 364 to a magnetic recording layer of a disk. The write coil layer 364 is formed on an insulating layer 369 and passes for at least one turn between the main magnetic pole layer 361 and the write shielding layer 365. The STO 362 is arranged at the ABS between a front end of the main magnetic pole layer 361 and a trailing shield 368. As shown in FIG. 5, a high-frequency electromagnetic field is generated by exciting spin waves.

Figure 6:
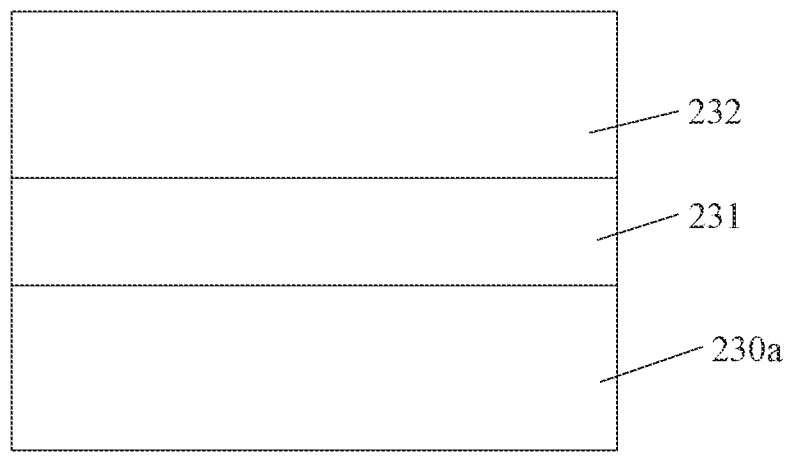
FIG. 6 is a schematic structural diagram of an MAMR head slider according an embodiment of the present disclosure.
Figure 7:
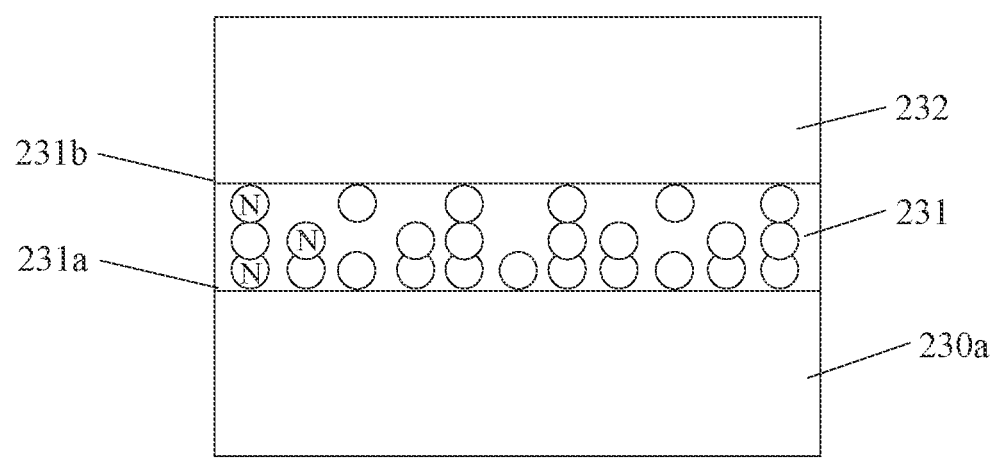
FIG. 7 is a schematic structural diagram of an MAMR head slider according another embodiment of the present disclosure.

FIGS. 6 and 7 are schematic structural diagrams of an MAMR head slider according a preferred embodiment of the present disclosure.

Specifically, the MAMR head slider 230 includes a slider substrate 230a, a seed layer 231 formed on the slider substrate 230a, and a DLC layer 232 formed on the seed layer 231. Commonly, the slider substrate 230a is made of a metal oxide, such as MgO. Specifically, the SiN layer 231 is formed between the slider substrate 230a and the DLC layer 232 as a seed layer 231. The content of nitrogen in the SiN layer 231 is 9%-17%, and the SiN layer 231 has a thickness in a range of 3-7 Å, and the DLC layer 232 has a thickness greater than that of the SiN layer 231 and in the range of 10-20 Å. Preferably, the SiN layer 231 has a thickness of 5 Å, and the DLC layer 232 has a thickness of 15 Å, so as to achieve better performance.

In a preferred embodiment, as shown in FIG. 7, the SiN layer 231 has a first interface 231a adjacent to the DLC layer 232 and a second interface 231b adjacent to the slider substrate 230a, and the content of nitrogen on the second interface 231b is greater than the content of nitrogen on the first interface 231a. Such an arrangement makes the SiN layer 231 have better adhesion and wear resistance. Specifically, from the second interface 231b to the first interface 231a, the content of nitrogen in the SiN layer 231 decreases. Circles in the figure represent nitrogen ions.

Figure 8:
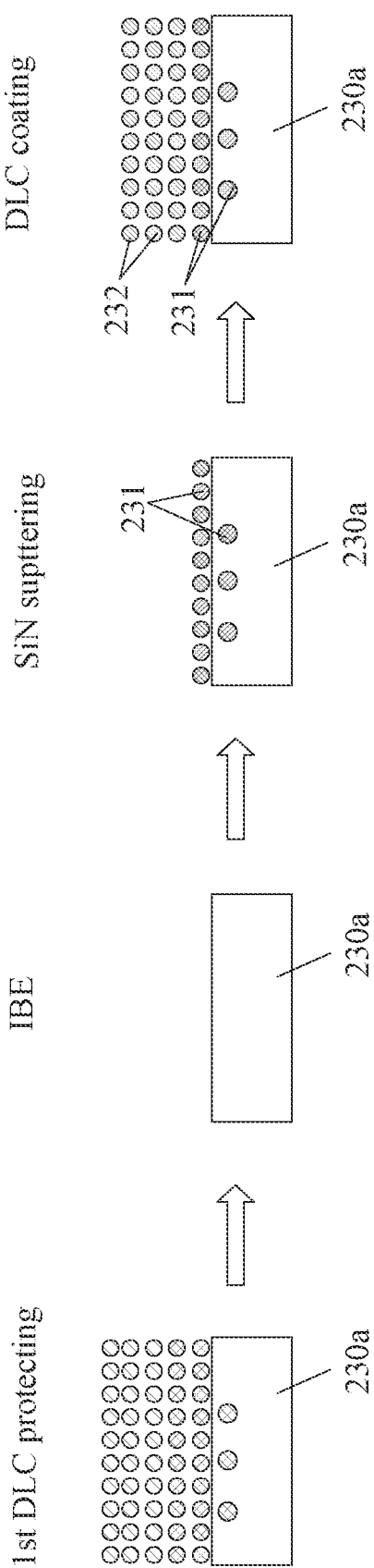
FIG. 8 is a schematic flow chart of forming a seed layer and a DLC layer on a slider substrate according to the present disclosure.

Referring to FIG. 8, an SiN layer 231 is formed by reactive sputtering on a slider substrate 230a by using an SiN target. Specifically, the slider substrate 230a is subjected to ion beam etching before reactive sputtering, then SiN sputtering is performed in a reaction chamber under predetermined conditions, then the slider substrate 230a with an SiN layer 231 formed is moved out of the reaction chamber, and a DLC layer 232 is deposited on the SiN layer 231 after a predetermined time. When the slider substrate 230a is subjected to ion beam etching, the bombardment of ion beam makes MgO debonded, oxygen ions are separated from MgO, so that metal phase Mg is generated microscopically on a surface of a head of the head slider, and the metal phase Mg may extend from the surface of the head to the interior by several nanometers, thereby forming an unstable shunt channel. As a result, more noise may be easily generated inside the head and affect performance of the head. Therefore, in view of this, in the present disclosure, the slider substrate 230a on which the SiN layer 231 is formed is moved out of the reaction chamber before the DLC layer 232 is deposited, to make the surface layer of the SiN layer 231 oxidized to some extent outside the reaction chamber, so as to make up for the loss of oxygen ions of MgO during ion beam etching and reduce the noise inside the head.

Moreover, by strictly controlling the thickness and content of nitrogen of the SiN layer 231 and the thickness of the DLC layer 232 during the formation, the SiN layer 231 and the DLC layer 232 can achieve good thermal stability, oxidation resistance and corrosion resistance, thereby improving reliability of the MAMR head and prolonging the service life of the MAMR head.

In conclusion, the MAMR head slider according to the present disclosure has a seed layer formed on the slider substrate and a DLC layer formed on the seed layer, where the seed layer is an SiN layer, the content of nitrogen in the SiN layer is 9%-17%, and preferably, the SiN layer has a thickness in the range of 3-7 Å. As an intermediate layer between the slider substrate and the DLC layer as a surface layer, the SiN layer has good adhesion. Moreover, the optimized and specific content of nitrogen and the specific thickness make the SiN layer as the seed layer and the DLC layer as the surface layer have good thermal stability and oxidation resistance, thereby further improving reliability of the MAMR head and prolonging the service life of the MAMR head. The device with a protective layer according to the present disclosure is further suitable for semiconductor or non-semiconductor products in other forms, and the application scope is not limited to the above embodiments.

The above disclosed are only preferred embodiments of the present disclosure and, certainly, cannot be used to limit the scope of the claims of the present disclosure. Therefore, equivalent changes made according to the claims of the present disclosure shall still fall within the scope of the present disclosure.

The invention claimed is:

1. A device with a protective layer, comprising:
a substrate;
a seed layer formed on the substrate; and
a diamond-like carbon (DLC) layer formed on the seed layer, wherein
the seed layer is a silicon nitride (SiN) layer, and a content of nitrogen in the silicon nitride layer is 9%-17%;
wherein the silicon nitride layer has a first interface adjacent to the diamond-like carbon layer and a second interface adjacent to the substrate, and a content of nitrogen on the second interface is greater than a content of nitrogen on the first interface.

2. The device according to claim 1, wherein the silicon nitride layer has a thickness in a range of 3-7 Å.

3. The device according to claim 2, wherein the silicon nitride layer has a thickness of 5 Å.

4. The device according to claim 1, wherein the diamond-like carbon layer has a thickness in a range of 10-20 Å.

5. The device according to claim 4, wherein the diamond-like carbon layer has a thickness of 15 Å.

6. The device according to claim 1, wherein from the second interface to the first interface, the content of nitrogen in the silicon nitride layer decreases.

7. The device according to claim 1, wherein the substrate comprises one or more selected from the group consisting of glass, sapphire, a ceramic, a polymer, a metal, and a metal oxide.

8. A microwave-assisted magnetic recording (MAMR) head slider, comprising a slider substrate embedded therein with an MAMR head with a spin torque oscillator, wherein the MAMR head slider further comprises a seed layer formed on the slider substrate and a diamond-like carbon (DLC) layer formed on the seed layer, wherein the seed layer is a silicon nitride (SiN) layer, and a content of nitrogen in the silicon nitride layer is 9%-17%;
wherein the silicon nitride layer has a first interface adjacent to the diamond-like carbon layer and a second interface adjacent to the substrate, and a content of nitrogen on the second interface is greater than a content of nitrogen on the first interface.

9. The head slider according to claim 8, wherein the silicon nitride layer has a thickness in a range of 3-7 Å.

10. The head slider according to claim 9, wherein the silicon nitride layer has a thickness of 5 Å.

11. The head slider according to claim 8, wherein the diamond-like carbon layer has a thickness in a range of 10-20 Å.

12. The head slider according to claim 11, wherein the diamond-like carbon layer has a thickness of 15 Å.

13. The head slider according to claim 8, wherein from the second interface to the first interface, the content of nitrogen in the silicon nitride layer decreases.

14. A head gimbal assembly, comprising a microwave-assisted magnetic recording (MAMR) head slider and a cantilever member for supporting the MAMR head slider wherein the MAMR head slider comprises a slider substrate embedded therein with an MAMR head with a spin torque oscillator, wherein the MAMR head slider further comprises a seed layer formed on the slider substrate and a diamond-like carbon (DLC) layer formed on the seed layer, wherein the seed layer is a silicon nitride (SiN) layer, and a content of nitrogen in the silicon nitride layer is 9%-17%;
wherein the silicon nitride layer has a first interface adjacent to the diamond-like carbon layer and a second interface adjacent to the substrate, and a content of nitrogen on the second interface is greater than a content of nitrogen on the first interface.

15. A disk drive unit, comprising:
a head gimbal assembly with a microwave-assisted magnetic recording (MAMR) head slider and a cantilever member for supporting the MAMR head slider;
a driving arm connected to the head gimbal assembly;
a series of disks; and
a spindle motor for rotating the disks;
wherein the MAMR head slider comprises a slider substrate embedded therein with an MAMR head with a spin torque oscillator, wherein the MAMR head slider further comprises a seed layer formed on the slider substrate and a diamond-like carbon (DLC) layer formed on the seed layer, wherein the seed layer is a silicon nitride (SIN) layer, and a content of nitrogen in the silicon nitride layer is 9%-17%;
wherein the silicon nitride layer has a first interface adjacent to the diamond-like carbon layer and a second interface adjacent to the substrate, and a content of nitrogen on the second interface is greater than a content of nitrogen on the first interface.

16. The head gimbal assembly according to claim 14, wherein the silicon nitride layer has a thickness in a range 3-7 Å.

17. The head gimbal assembly according to claim 14, wherein the diamond-like carbon layer has a thickness in a range of 10-20 Å.

18. The head gimbal assembly according to claim 14, wherein from the second interface to the first interface, the content of nitrogen in the silicon nitride layer decreases.

19. The disk drive unit according to claim 15, wherein the silicon nitride layer has a thickness in a range of 3-7 Å, and/or the diamond-like carbon layer has a thickness in a range of 10-20 Å.

20. The disk drive unit according to claim 15, wherein from the second interface to the first interface, the content of nitrogen in the silicon nitride layer decreases.

\* \* \* \* \*